(12) United States Patent
Liu

(10) Patent No.: US 8,033,212 B2
(45) Date of Patent: Oct. 11, 2011

(54) COMPOSITE STRAINER POT

(76) Inventor: Ming-Tung Liu, Taipei (TW)

(*) Notice: Subject to any disclaimer, the term of this patent is extended or adjusted under 35 U.S.C. 154(b) by 687 days.

(21) Appl. No.: 12/221,629

(22) Filed: Aug. 4, 2008

(65) Prior Publication Data

US 2010/0024659 A1 Feb. 4, 2010

(51) Int. Cl.
*A41J 31/02* (2006.01)
*A47G 19/16* (2006.01)

(52) U.S. Cl. ............................ 99/306; 99/323

(58) Field of Classification Search ............... 99/289 R, 99/290, 299, 304–306, 323; 210/248, 473
See application file for complete search history.

(56) References Cited

U.S. PATENT DOCUMENTS

| | | | |
|---|---|---|---|
| 1,813,646 A * | 7/1931 | Turkenton | 99/305 |
| 2,626,342 A * | 1/1953 | Miller | 219/436 |
| 2,641,991 A * | 6/1953 | Wilcox | 99/281 |
| 5,632,194 A * | 5/1997 | Lin | 99/285 |
| 5,813,317 A * | 9/1998 | Chang | 99/285 |
| 5,826,493 A * | 10/1998 | Tien Lin | 99/306 |
| 6,058,827 A * | 5/2000 | Lin Tien | 99/299 |
| 6,164,190 A * | 12/2000 | Tien Lin | 99/299 |
| 6,327,965 B1 * | 12/2001 | Lin Tien | 99/299 |
| 6,494,128 B1 * | 12/2002 | Yu | 99/285 |
| 6,564,697 B2 * | 5/2003 | Maxwell et al. | 99/287 |
| 6,805,040 B1 * | 10/2004 | Chang et al. | 99/285 |
| 6,810,789 B2 * | 11/2004 | Chung et al. | 99/299 |
| 6,835,915 B2 * | 12/2004 | Timm | 219/432 |
| 7,073,428 B2 * | 7/2006 | Chung et al. | 99/283 |
| 2011/0005400 A1 * | 1/2011 | Tien et al. | 99/298 |

* cited by examiner

*Primary Examiner* — Mark Graham
(74) *Attorney, Agent, or Firm* — Charles E. Baxley

(57) ABSTRACT

A composite strainer pot has a base, a container mounted on the base, a connecting dish combining the base and the container, a filter assembly mounted in the container and a valve assembly mounted between the base and the container. The container that is usually filled with hot water can be made with glass to maintain the quality and the lifespan. The base that is placed on a table or the like can be made with plastic to reduce the cost and is not easily damaged. Therefore, the strainer pot is durable and has a prolonged useful life.

17 Claims, 7 Drawing Sheets

COMPOSITE STRAINER POT

BACKGROUND OF THE INVENTION

1. Field of the Invention

The present invention relates to a pot, especially to a composite strainer pot that has a base and a container of different materials combined with each other.

2. Description of the Prior Arts

Parts of plant such as but not limited to: leaves such as tea and herbs; beans, seeds nuts or fruits such as coffee; flowers, such as rose; and the like are steeped alone or in combination in water to extract and flavor the water. Since parts of plants are not pleasant to drink, and steeping for too long causes tannin to build up and impair taste, tea pots and strainers were designed to separate the plants and the water. However, since using teapot with strainer causes waste and spillage, strainer pots were designed.

With reference to FIG. 7, a conventional strainer pot (70) comprises a container (71), a strainer (72) and a release valve (73). The container (71) is plastic and has a bottom (711). The strainer (72) is mounted on the bottom (711) of the container (71). The release valve (73) is mounted slidably under the bottom (711) of the container (71). When the container (71) is filled with water, the release valve (73) is closed by hydraulic pressure. To open the release valve (73), the conventional strainer pot (70) is mounted on top of a glass or mug and the release valve (73) slides into the container (71) to allow steeped water to flow through the release valve (73) and to trap the parts of plants with the strainer (72).

The conventional strainer pot (70) as described has transparent container (71) such as plastic, glass or the like to allow users to see quantity or condition of the steeped water. Although the plastic container (71) is durable and can be made integrally, however, with long term use and filling with hot water, the plastic container (71) is aged and stained and the conventional strainer pot (70) appears dirty. While if the container (71) is glass, the glass container (71) will not be aged and stained with long term and filling with hot water. However, since structure of the container (71) is complicated, the glass container (71) is hard to be manufactured integrally and cost a lot. Therefore, no glass container (71) of the conventional strainer pot (70) currently exists.

To overcome the shortcomings, the present invention provides a composite pot to mitigate or obviate the aforementioned problems.

SUMMARY OF THE INVENTION

The main objective of the present invention is to provide a composite strainer pot. The composite strainer pot has a base, a container being mounted on the base, a connecting dish combining the base and the container, a filter assembly being mounted in the container and a valve assembly being mounted between the base and the container.

The container that is usually filled with hot water can be made with glass to maintain the quality and the lifespan. The base that is placed on a table or the like can be made with plastic to reduce the cost and is not easily damaged. Therefore, the strainer pot is durable and has a prolonged useful life.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
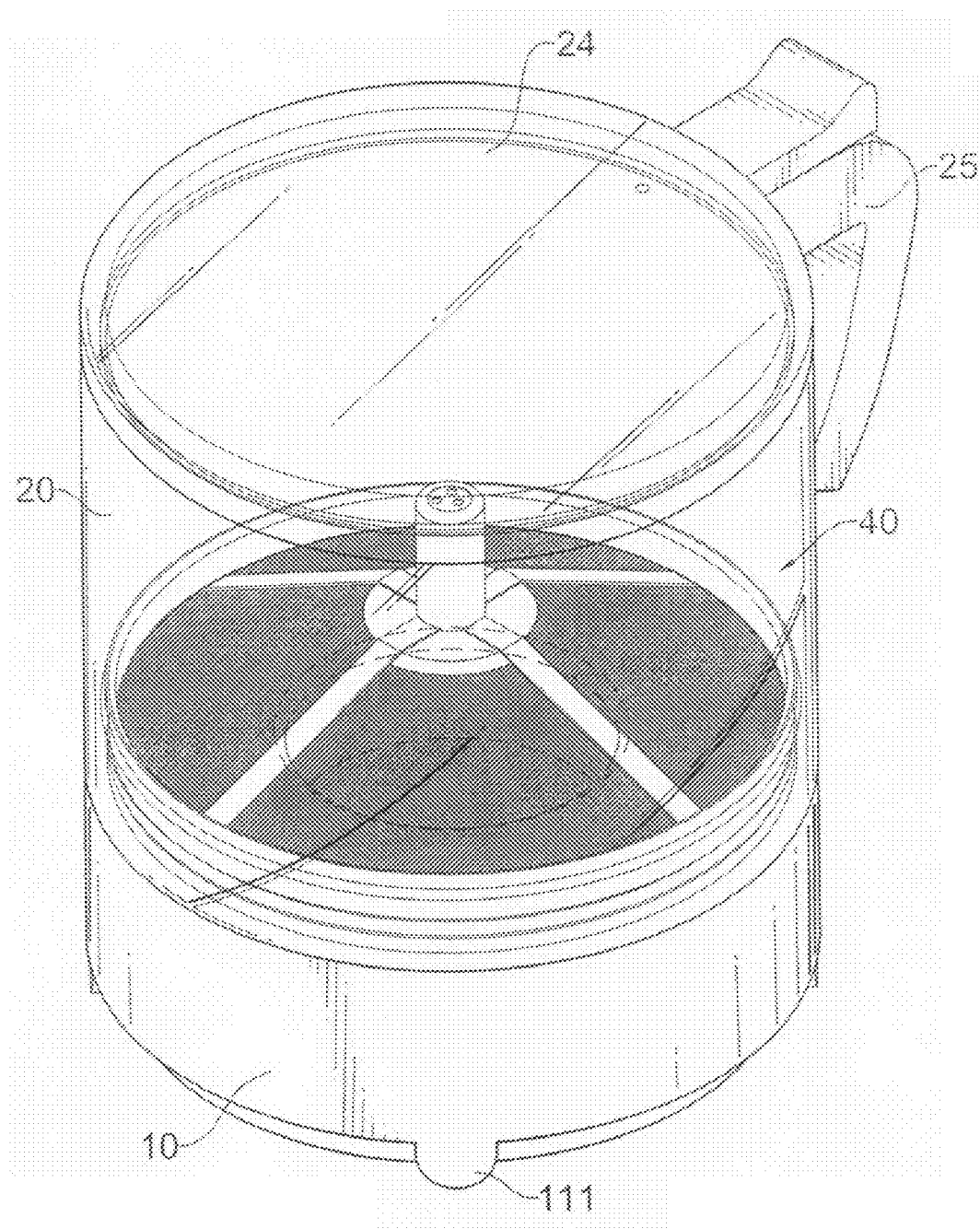
FIG. 1 is a perspective view of a first embodiment of a composite strainer pot in accordance with the present invention.
Figure 2:
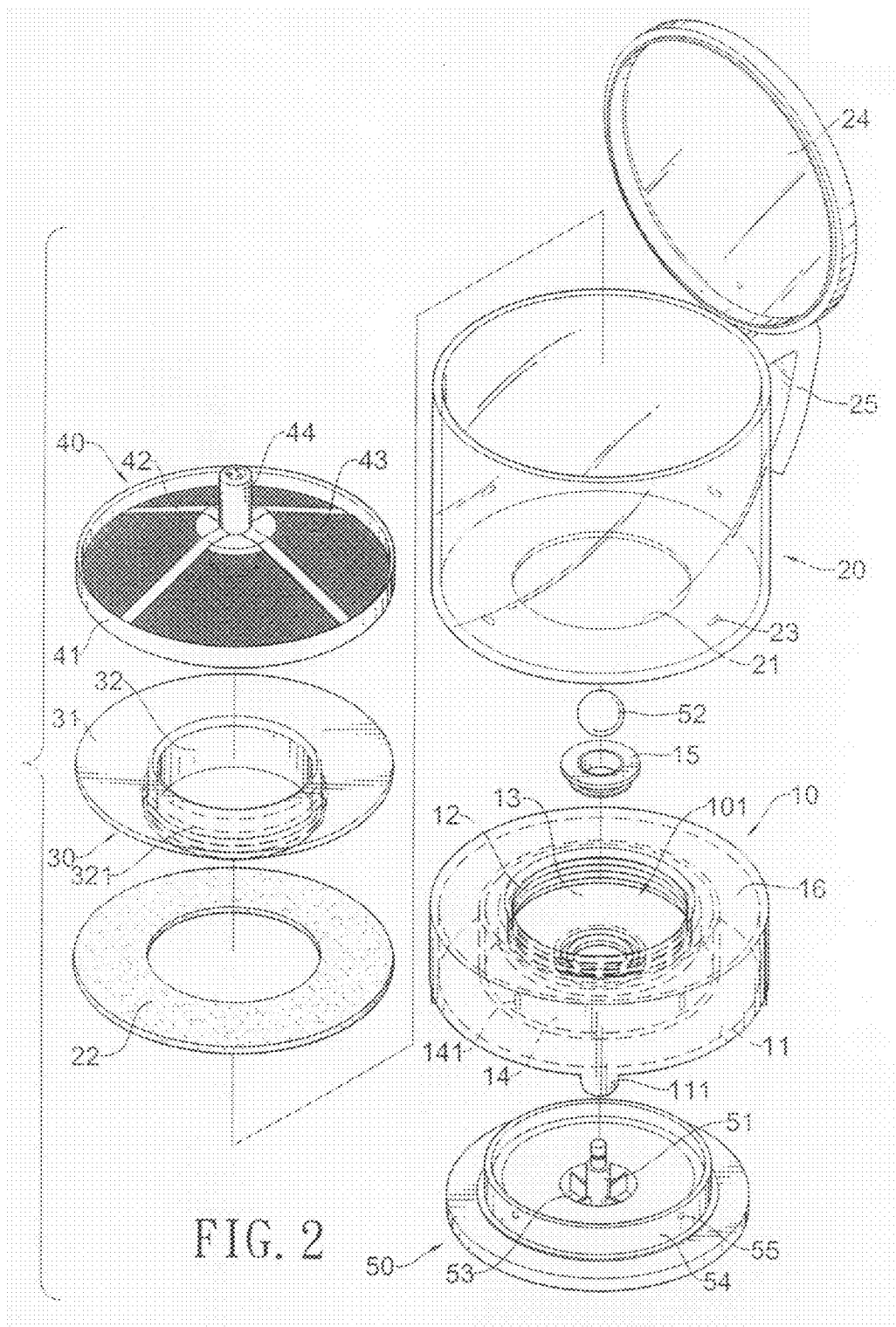
FIG. 2 is an exploded perspective view of the composite strainer pot in FIG. 1.
Figure 4:
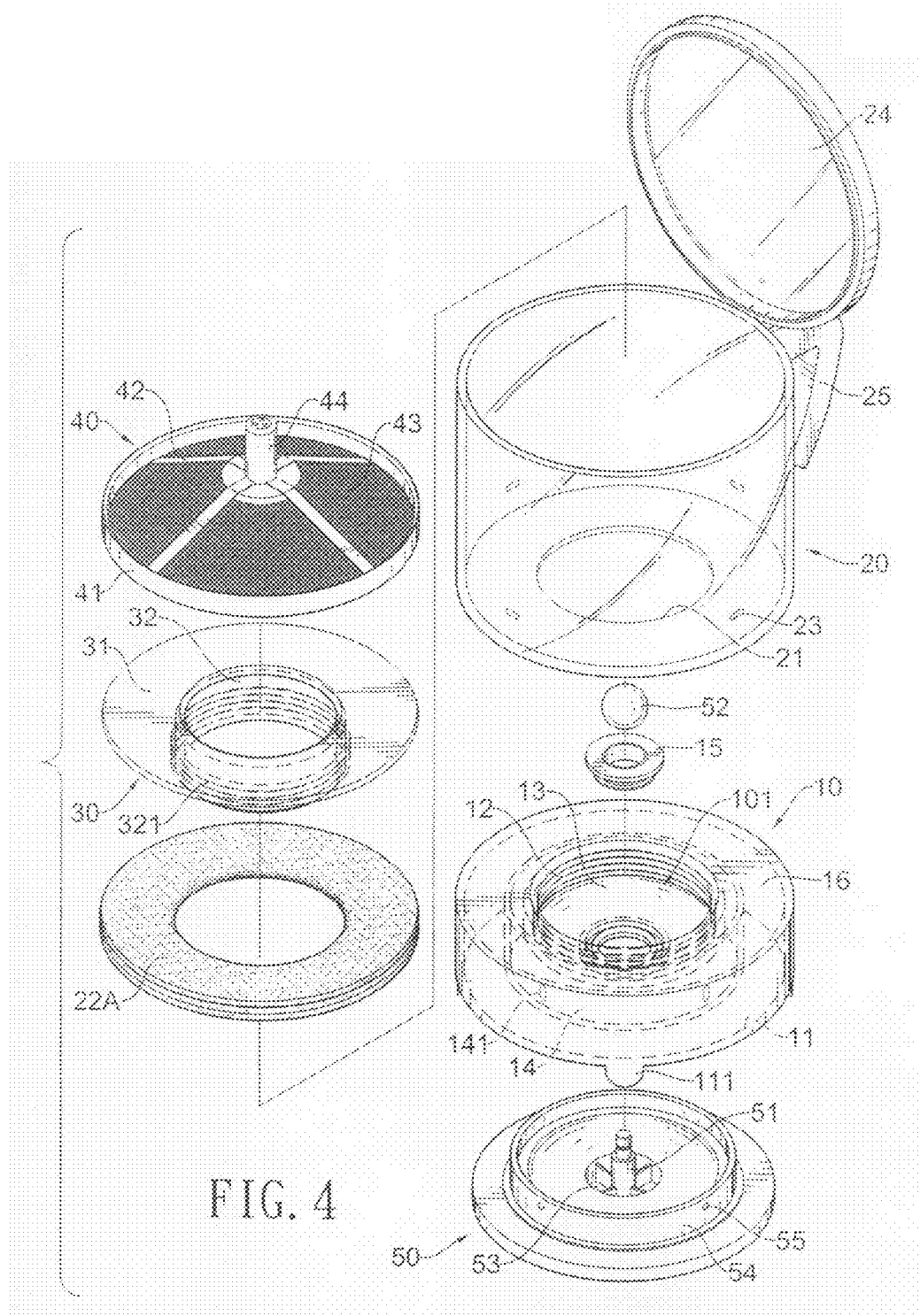
FIG. 4 is an exploded perspective view of a second embodiment of a composite strainer pot in accordance with the present invention.

With reference to FIGS. 1, 2 and 4, a composite strainer pot in accordance with the present invention comprises a base (10), a container (20), a connecting dish (30), a filter assembly (40) and a valve assembly (50).

Figure 3:
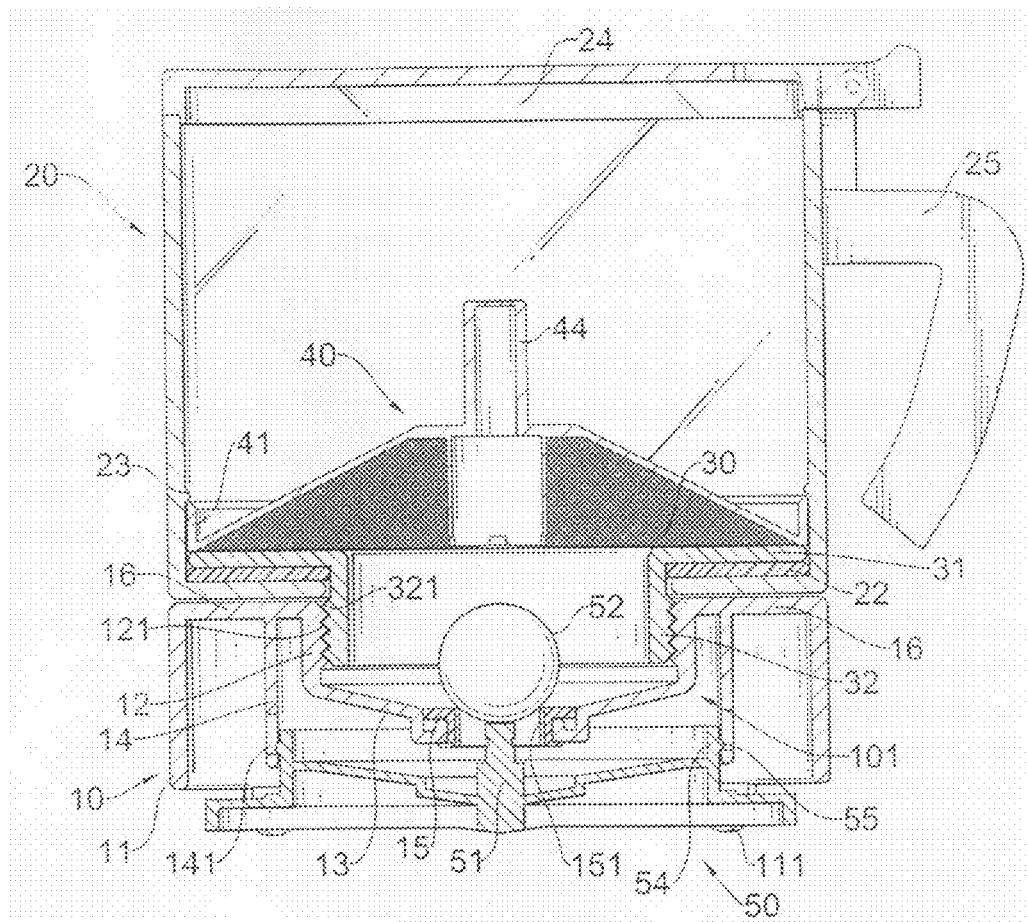
FIG. 3 is a side view in partial section of the composite strainer pot in FIG. 1.

With further reference to FIG. 3, the base (10) may be plastic and has a top ring (16), an outer wall (11), an inner wall (101), an optional limiting wall (14) and a valve seat (15).

The top ring (16) has an outer edge, an inner edge, a lower surface and an upper surface.

The outer wall (11) is formed around the outer edge of the top ring (16) on the lower surface of the top ring (16), has a distal edge and may have multiple standing protrusions (111). The standing protrusions (111) are separately formed on the distal edge of the outer wall (11) to allow the base (10) to be stably placed up on a plane.

The inner wall (101) is formed around the inner edge of the top ring (16) on the lower surface of the top ring (16) and has a connecting ring (12) and a funneling bottom (13). The connecting ring (12) is formed around the inner edge of the top ring (16) and has an inner surface (121) and a distal edge. The inner surface (121) may be threaded. The funneling bottom (13) is formed around the distal edge of the connecting ring (12), is tapered and has an inner edge and a mounting hole. The mounting hole is formed through the funneling bottom (13).

The limiting wall (14) is formed around the lower surface of the top ring (16) between the outer wall (11) and the inner wall (101) and has multiple slots (141). The slots (141) are separately formed through the limiting wall (14). Each slot (141) has a lower end and an upper end.

The valve seat (15) may be rubber, plastic or the like, is mounted around the inner edge of the funneling bottom (13) of the inner wall (101) and has a through hole (151). The through hole (151) is formed through the valve seat (15).

The container (20) may be glass, is mounted on the upper surface of the top ring (16) of the base (10), has an open top, a circular bottom, an inner surface, an outer surface, a top edge, a mounting hole (21) and may have a washer (22, 22A), multiple stopping protrusions (23), a lid (24) and a handle (25).

The circular bottom of the container (20) corresponds to and is mounted on the upper surface of the top ring (16) of the base (10).

The mounting hole (21) is formed through the circular bottom of the container (20).

Figure 5:
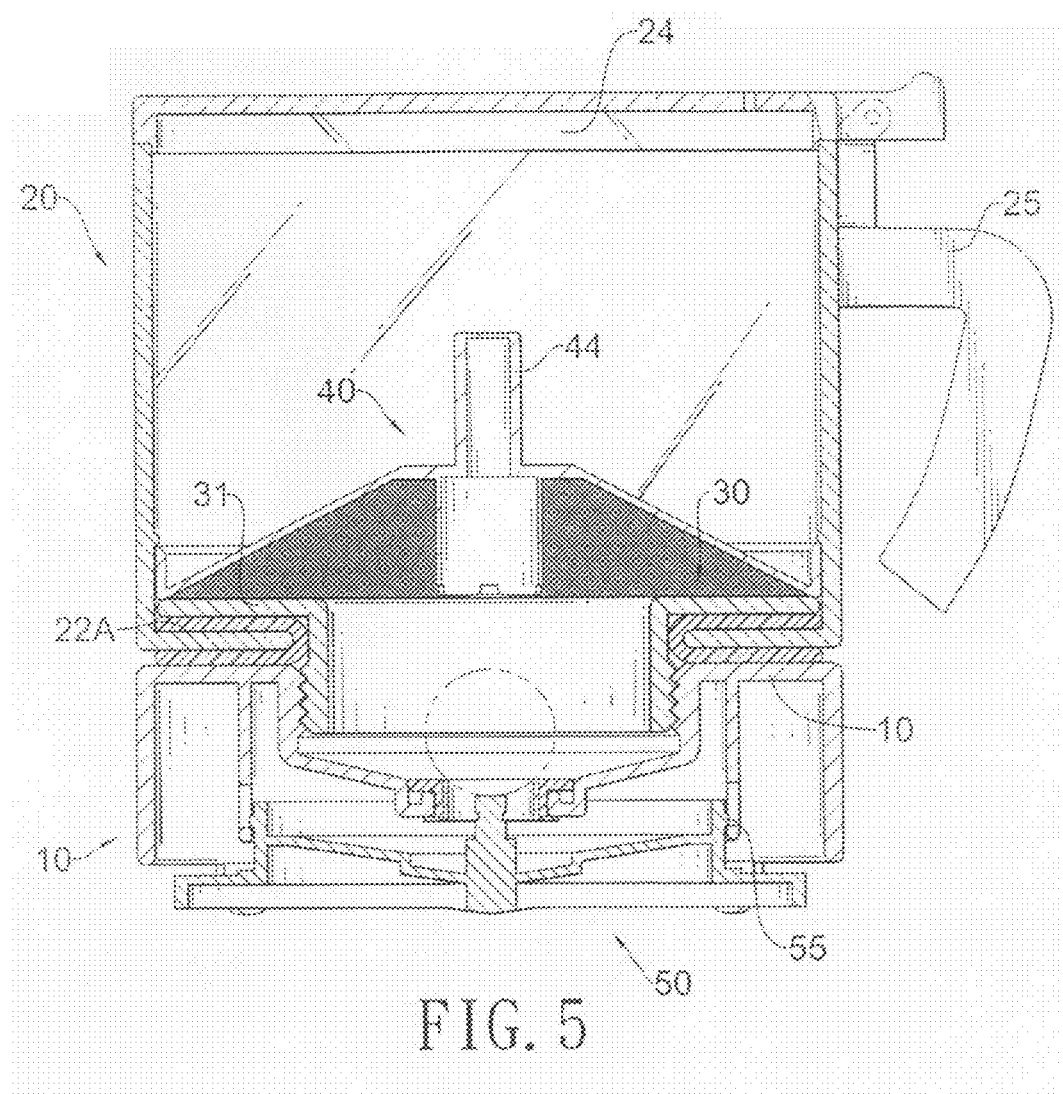
FIG. 5 is a side view in partial section of the composite strainer pot in FIG. 4.

With further reference to FIG. 5, the washer (22, 22A) is circular and is mounted on the circular bottom of the container (20). The washer (22A) has an outer circular wall and a holding recess. The holding recess is formed in the outer circular wall of the washer (22A) and is mounted around the circular bottom of the container (20) to cushion the circular bottom of the container (20).

The stopping protrusions (23) are separately formed on and around the inner surface of the container (20).

The lid (24) is pivotally connected to the top edge of the container (20) and selectively uncovers the open top of the container (20) to allow water to be poured into the container (20) and covers the open top of the container (20) to prevent the water from being contaminated.

The handle (25) is attached to the outer surface of the container (20) adjacent to the open top of the container (20) to allow the strainer pot to be moved easily.

The connecting dish (30) is mounted in the container (20) and on the circular bottom of the container (20), may be mounted on the washer (22, 22A) of the container (20), is attached to the connecting ring (12) of the inner wall (101) of the base (10) to combine the base (10) and the container (20) and has a mounting ring (31) and a connecting ring (32).

The mounting ring (31) is mounted on the circular bottom of the container (20), may be mounted on the washer (22, 22A) of the container (20) and has an inner edge.

The connecting ring (32) of the connecting dish (30) is transversely formed around the inner edge of the mounting ring (31) of the connecting dish (30) and has an outer surface (321). The outer surface (321) may be threaded and engages the inner surface (121) of the connecting ring (12) of the inner wall (101) of the base (10).

The filter assembly (40) is mounted in the container (20) and on the connecting dish (30) and may have an outer frame (41), multiple reinforcing spokes (42), a net (43) and a rod (44).

The outer frame (41) is a loop, is mounted on and around the mounting ring (31) of the connecting dish (30) and may abut the stopping protrusions (23) of the container (20).

The reinforcing spokes (42) are formed on the outer frame (41) to strengthen the filter assembly (40) and are beveled. Each reinforcing spoke (42) has a distal end. The distal end of the reinforcing spoke (42) is connected to the distal ends of the other reinforcing spokes (42).

The net (43) is mounted within the outer frame (41) and may be mounted between the reinforcing spokes (42).

The rod (44) is formed on and protrudes transversely from the distal ends of the reinforcing spokes (42) to allow the rod (44) to be pulled to easily remove the filter assembly (40).

The valve assembly (50) is mounted in the base (10) and has a plug (52) and a valve disc.

The plug (52) may be rubber, plastic or the like, is mounted on the funneling bottom (13) of the inner wall (101) of the base (10) and selectively plugs the through hole (151) of the valve seat (15) of the base (10).

The valve disc is mounted within the distal edge of the outer wall (11) of the base (10), has a rod (51) and multiple outlets (53) and may have a circular wall (54) and multiple limiting protrusions (55).

The rod (51) is formed on and protrudes from the valve disc, is mounted through the through hole (151) of the valve seat (15) of the base (10) and selectively pushes the plug (52) to unplug the through hole (151) of the valve seat (15) of the base (10).

The outlets (53) are separately formed through the valve disc and are arranged around the rod (51).

The circular wall (54) is formed on the valve disc and around the outlets (53) of the valve disc, is mounted adjacent to the limiting wall (14) of the base (10) and has an engaging surface. The engaging surface of the circular wall (54) corresponds to the limiting wall (14) of the base (10).

The limiting protrusions (55) are separately formed on the engaging surface of the circular wall (54), respectively correspond to and are mounted in the slots (141) of the limiting wall (14) of the base (10). Therefore, the valve disc can move up and down relative to the base (10) and cannot rotate relative to the base (10).

When the strainer pot as described is placed on the plane, the valve disc of the valve assembly (50) slides down to allow the limiting protrusions (55) of the valve disc of the valve assembly (50) to be mounted in the lower end of the slot (141) of the limiting wall (14) of the base (10) and the plug (52) of the valve assembly (50) plugs the through hole (151) of the valve seat (15) of the base (10). As water is poured into the container (20), a hydraulic pressure of the water presses the plug (52) to ensure the plug (52) securely plugs the through hole (151) of the valve seat (15) of the base (10) and to prevent the water from flowing through the through hole (151) of the valve seat (15) of the base (10).

Figure 6:
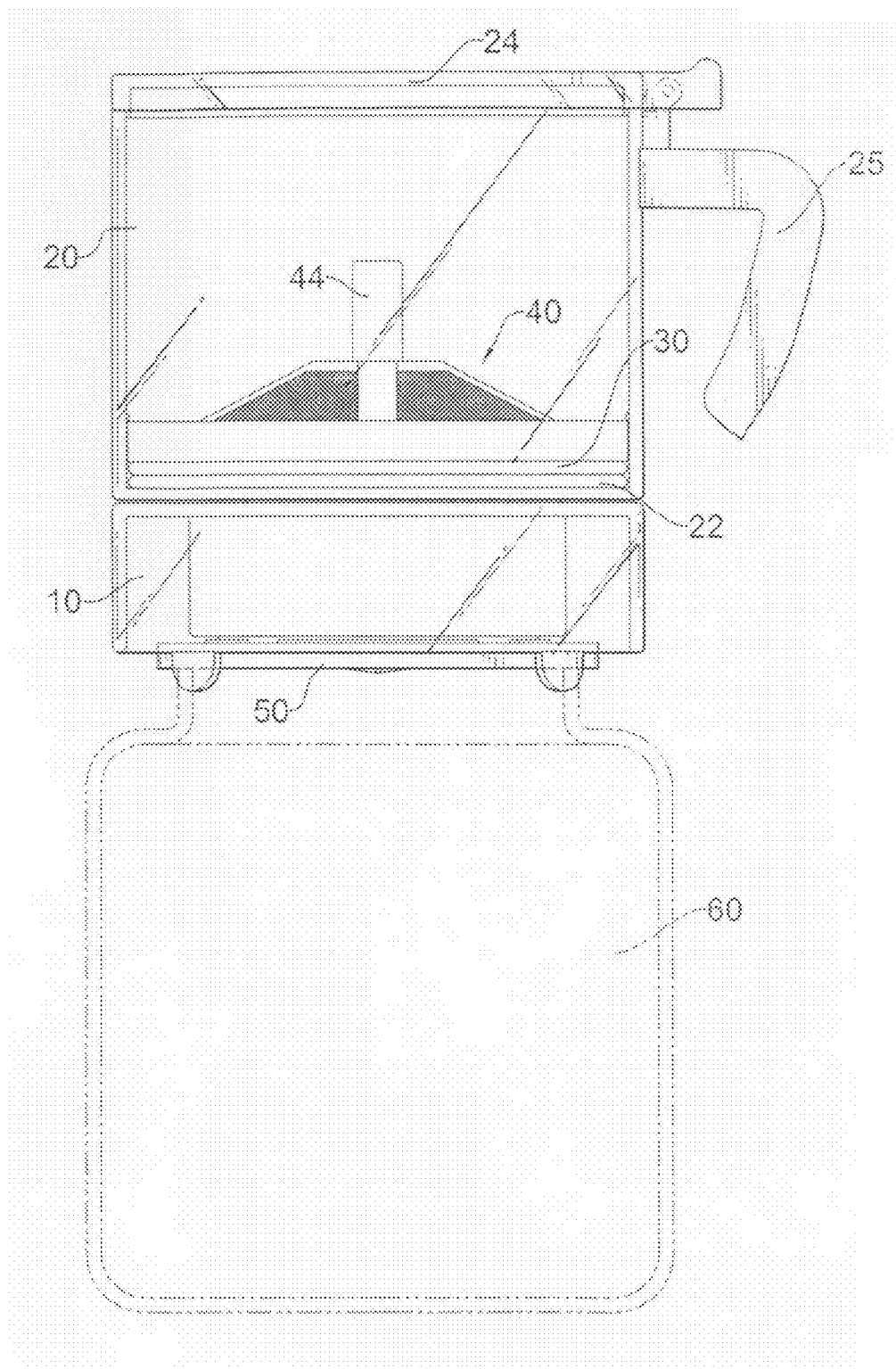
FIG. 6 is an operational side view of the composite strainer pot in FIG. 1, shown mounted on a bottle in phantom lines.
Figure 7:
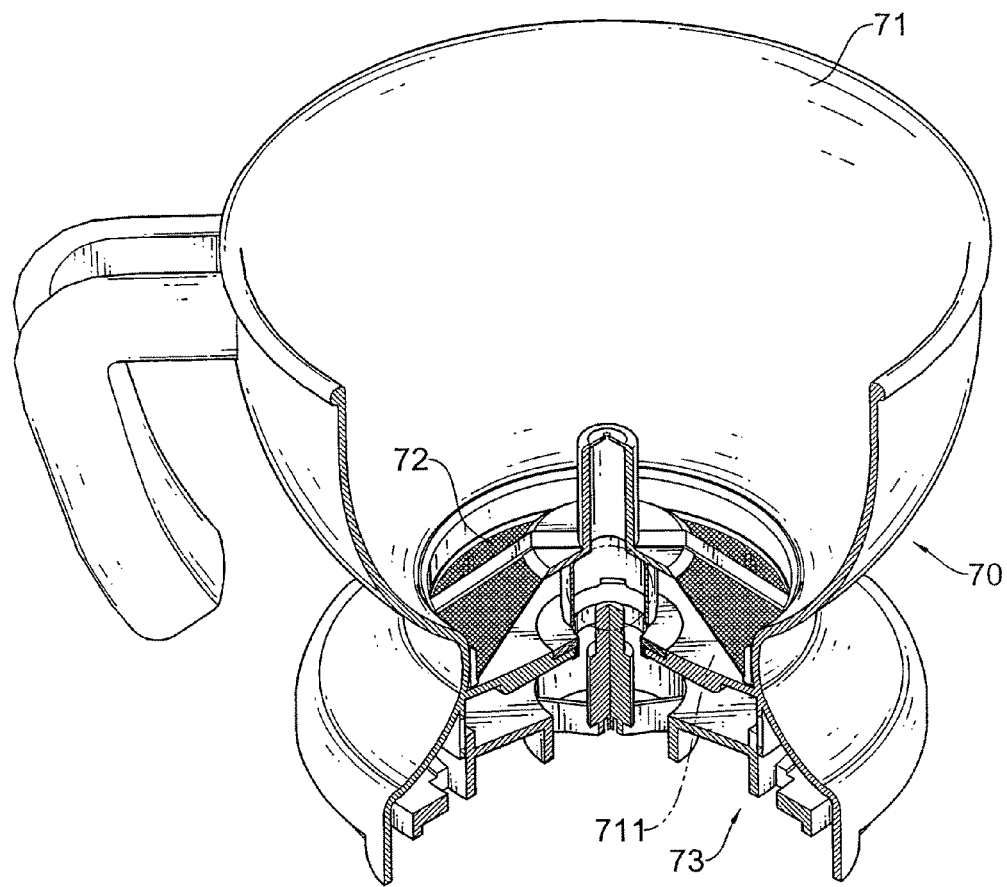
FIG. 7 is a cross-sectional perspective view of a conventional strainer pot in accordance with the prior art.

With further reference to FIG. 6, when the strainer pot as described is placed on a container (60), a distal edge of the container (60) pushes the valve disc up to allow the rod (51) of the valve disc to push the plug (52) and unplug the through hole (151) of the valve seat (15) of the base (10). Therefore, the water in the container (20) flows through the through hole (151) of the valve seat (15) of the base (10), the outlets (53) of the valve disc and into the cup (60).

The strainer pot as described has the following advantages. Because the container (20) and the base (10) are separated structures, the container (20) and the base (10) may be made with different material as desired. The container (20) has a simple structure and, therefore, may be made with glass to maintain the quality and the lifespan. The base (10) has a complicated structure and, therefore, may be made with plastic to reduce the cost. Then, the connecting dish (30) combines the container (20) and the base (10). The container (20) that is usually filled with hot water does not age and stain with long term use and filling with the hot water and the base (10) is not easily damaged. Therefore, the strainer pot is durable and has a prolonged useful life.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A composite strainer pot comprising
a base having
   a top ring having
     an outer edge;
     an inner edge;
     a lower surface; and
     an upper surface;
   an outer wall being formed around the outer edge of the top ring on the lower surface of the top ring and having
     a distal edge;
   an inner wall being transversely formed around the inner edge of the top ring on the lower surface of the top ring and having
     a connecting ring being formed around the inner edge of the top ring and having
      an inner surface; and
      a distal edge; and a funneling bottom being formed around the distal edge of the connecting ring, being tapered and having
an inner edge; and
a mounting hole being formed through the funneling bottom; and
a valve seat being mounted around the inner edge of the funneling bottom of the inner wall and having a through hole being formed through the valve seat;
a container being mounted on the upper surface of the top ring of the base and having
an open top;
a circular bottom corresponding to and being mounted on the upper surface of the top ring of the base; and
a mounting hole being formed through the circular bottom of the container;
a connecting dish being mounted in the container and on the circular bottom of the container, being attached to the connecting ring of the inner wall of the base and having
a mounting ring being mounted on the circular bottom of the container and having an inner edge; and
a connecting ring being transversely formed around the inner edge of the mounting ring of the connecting dish and having
an outer surface engaging the inner surface of the connecting ring of the inner wall of the base;
a filter assembly being mounted in the container and on the connecting dish; and
a valve assembly being mounted in the base and having
a plug being mounted on the funneling bottom of the inner wall of the base and selectively plugging the through hole of the valve seat of the base; and
a valve disc being mounted between the distal edge of the outer wall of the base and having
a rod being formed on and protruding from the valve disc, being mounted through the through hole of the valve seat of the base and selectively pushing the plug; and
multiple outlets being separately formed through the valve disc and being arranged around the rod.

2. The composite strainer pot as claimed in claim 1, wherein the container further has a washer being circular and being mounted on the circular bottom of the container.

3. The composite strainer pot as claimed in claim 2, wherein the washer further has
an outer circular wall; and
a holding recess being formed in the outer circular wall of the washer and being mounted around the circular bottom of the container.

4. The composite strainer pot as claimed in claim 1, wherein the inner surface of the connecting ring of the inner wall of the base and the outer surface of the connecting ring of the connecting dish are threaded.

5. The composite strainer pot as claimed in claim 2, wherein the inner surface of the connecting ring of the inner wall of the base and the outer surface of the connecting ring of the connecting dish are threaded.

6. The composite strainer pot as claimed in claim 3, wherein the inner surface of the connecting ring of the inner wall of the base and the outer surface of the connecting ring of the connecting dish are threaded.

7. The composite strainer pot as claimed in claim 1, wherein
the base is plastic;
the valve seat of the base and the plug of the valve assembly are rubber; and
the container is glass.

8. The composite strainer pot as claimed in claim 2, wherein
the base is plastic;
the valve seat of the base and the plug of the valve assembly are rubber; and
the container is glass.

9. The composite strainer pot as claimed in claim 3, wherein
the base is plastic;
the valve seat of the base and the plug of the valve assembly are rubber; and
the container is glass.

10. The composite strainer pot as claimed in claim 1, wherein
the base further has a limiting wall being formed around the lower surface of the top ring between the outer wall and the inner wall and having multiple slots being separately formed through the limiting wall; and
the valve disc of the valve assembly further has
a circular wall being formed on the valve disc and around the outlets of the valve disc, being mounted adjacent to the limiting wall of the base and having an engaging surface corresponding to the limiting wall of the base; and
multiple limiting protrusions being separately formed on the engaging surface of the circular wall, respectively corresponding to and being mounted in the slots of the limiting wall of the base.

11. The composite strainer pot as claimed in claim 2, wherein
the base further has a limiting wall being formed around the lower surface of the top ring between the outer wall and the inner wall and having multiple slots being separately formed through the limiting wall; and
the valve disc of the valve assembly further has
a circular wall being formed on the valve disc and around the outlets of the valve disc, being mounted adjacent to the limiting wall of the base and having an engaging surface corresponding to the limiting wall of the base; and
multiple limiting protrusions being separately formed on the engaging surface of the circular wall, respectively corresponding to and being mounted in the slots of the limiting wall of the base.

12. The composite strainer pot as claimed in claim 3, wherein
the base further has a limiting wall being formed around the lower surface of the top ring between the outer wall and the inner wall and having multiple slots being separately formed through the limiting wall; and
the valve disc of the valve assembly further has
a circular wall being formed on the valve disc and around the outlets of the valve disc, being mounted adjacent to the limiting wall of the base and having an engaging surface corresponding to the limiting wall of the base; and
multiple limiting protrusions being separately formed on the engaging surface of the circular wall, respectively corresponding to and being mounted in the slots of the limiting wall of the base.

13. The composite strainer pot as claimed in claim 1, wherein the filter assembly further has
an outer frame being a loop and being mounted on and around the mounting ring of the connecting dish; and
a net being mounted within the outer frame.

14. The composite strainer pot as claimed in claim 13, wherein the filter assembly further has
multiple reinforcing spokes being formed on the outer frame, being beveled and each reinforcing spoke having a distal end being connected to the distal ends of the other reinforcing spokes; and
a rod being formed on and protruding transversely from the distal ends of the reinforcing spokes, wherein,
the net of the filter assembly is mounted between the reinforcing spokes.

15. The composite strainer pot as claimed in claim 14, wherein
the container further has
an inner surface; and
multiple stopping protrusions being separately formed on and around the inner surface of the container; and
the outer frame of the filter assembly abuts the stopping protrusions of the container.

16. The composite strainer pot as claimed in claim 1, wherein the outer wall of the base further has multiple standing protrusions being separately formed on the distal edge of the outer wall.

17. The composite strainer pot as claimed in claim 1, wherein the container further has
an outer surface;
a top edge;
a lid being pivotally connected to the top edge of the container and selectively uncovering the open top of the container; and
a handle being attached to the outer surface of the container adjacent to the open top of the container.

* * * * *